United States Patent
Aziz et al.

(10) Patent No.: US 11,261,720 B2
(45) Date of Patent: Mar. 1, 2022

(54) METHODOLOGY TO MAXIMIZE NET RESERVOIR CONTACT FOR UNDERBALANCED COILED TUBING DRILLING WELLS

(71) Applicant: Saudi Arabian Oil Company, Dhahran (SA)

(72) Inventors: Ahmad Azly Bin Abdul Aziz, Dhahran (SA); Ferney Geovany Moreno Sierra, Bogota (CO)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/872,137

(22) Filed: May 11, 2020

(65) Prior Publication Data
US 2021/0348493 A1 Nov. 11, 2021

(51) Int. Cl.
| | | |
|---|---|---|
| *E21B 44/00* | (2006.01) |
| *E21B 7/04* | (2006.01) |
| *E21B 47/06* | (2012.01) |
| *E21B 47/008* | (2012.01) |
| *E21B 45/00* | (2006.01) |

(Continued)

(52) U.S. Cl.
CPC ............... *E21B 44/00* (2013.01); *E21B 7/04* (2013.01); *E21B 45/00* (2013.01); *E21B 47/008* (2020.05); *E21B 47/06* (2013.01); *E21B 49/00* (2013.01); *E21B 49/005* (2013.01); *G01V 9/00* (2013.01); *G06F 16/24568* (2019.01); *G06Q 50/02* (2013.01)

(58) Field of Classification Search
CPC ................................ E21B 41/0035
See application file for complete search history.

(56) References Cited

U.S. PATENT DOCUMENTS

| | | | |
|---|---|---|---|
| 4,541,490 A | 9/1985 | Bigbie et al. |
| 5,076,356 A | 12/1991 | Reimert |
| (Continued) | | |

FOREIGN PATENT DOCUMENTS

WO 2016101374 6/2016

OTHER PUBLICATIONS

Blumbaugh, "Cleveland Formation—Recent Results and Lessons Learned During Horizontal Re-development of a Mature Field," SPE-142790-MS-P, Presented at the SPE Middle East Unconventional Gas Conference and Exhibition, Muscat, Oman, Jan. 31-Feb. 2, 2011; Society of Petroleum Engineers, 2011, 9 pages.

(Continued)

*Primary Examiner* — Kristyn A Hall
(74) *Attorney, Agent, or Firm* — Fish & Richardson P.C.

(57) ABSTRACT

The present disclosure describes computer-implemented method for monitoring a well operation, the method including: accessing a plurality of streams of data received from multiple sources during the well operation, wherein: the multiple sources include a well testing process, a biosteering process, a geosteering process, and a drilling process, and the well operation includes sidetracking and drilling one or more laterals from a motherbore; combining the plurality of streams of data on a single montage with a common horizontal axis to track the one or more laterals from the motherbore; and presenting the single montage on a display device to an operator running the well operation.

18 Claims, 11 Drawing Sheets

(51) Int. Cl.
  *E21B 49/00* (2006.01)
  *G01V 9/00* (2006.01)
  *G06F 16/2455* (2019.01)
  *G06Q 50/02* (2012.01)

(56) References Cited

U.S. PATENT DOCUMENTS

| | | | |
|---|---|---|---|
| 6,491,108 | B1 | 12/2002 | Slup et al. |
| RE41,508 | E | 8/2010 | Treece |
| 7,828,060 | B2 | 11/2010 | Churchill |
| 7,881,155 | B2 | 2/2011 | Close |
| 9,835,009 | B2 | 12/2017 | Hess et al. |
| 10,487,587 | B2 | 11/2019 | Cummins |
| 2010/0059220 | A1 | 3/2010 | Wilberg et al. |
| 2011/0098931 | A1 | 4/2011 | Kosmala et al. |
| 2013/0144531 | A1* | 6/2013 | Johnston ............ E21B 44/00 702/9 |
| 2014/0124265 | A1 | 5/2014 | Al-Yami et al. |
| 2014/0209383 | A1* | 7/2014 | Vuyk, Jr. ............ E21B 41/0035 175/27 |
| 2015/0012219 | A1* | 1/2015 | Selman ............ E21B 49/005 702/9 |
| 2015/0240616 | A1 | 8/2015 | Woodward et al. |
| 2019/0114352 | A1 | 4/2019 | Sung |

OTHER PUBLICATIONS

Bybee, "Coiled-Tubing Underbalanced Drilling in the Lisburne Field, Alaska," SPE-0608-0079-JPT, Journal of Petroleum Technology, Jun. 2008, 60(06): 79-82.
Guizada et al., "Application of Underbalanced Coiled Tubing Drilling Technology to Enhance Gas Production in Deep Carbonate Reservoirs," SPE-192786-MS, Presented at the Abu Dhabi International Petroleum Exhibition & Conference, Abu Dhabi, UAE, Nov. 12-15, 2018; Society of Petroleum Engineers, 2018, 8 pages.
Johnson et al., "Coiled-Tubing Underbalanced Drilling Applications in the Lisburne Field, Alaska," IADC/SPE 108337, Presented at the IADC/SPE Managed Pressure Drilling and Underbalanced Operations Conference and Exhibition, Galveston, Texas, Mar. 28-29, 2007; IADC/SPE, 2007, 11 pages.
Kavanagh et al., "Underbalanced Coiled Tubing Drilling Practices in a Deep, Low-Pressure Gas Reservoir," IPTC-10308-MS, Presented at the International Petroleum Technology Conference, Doha, Qatar, Nov. 21-23, 2005; IPTC 2005.
Leising et al., "Underbalanced Drilling With Coiled Tubing and Well Productivity," SPE-28870-MS, Presented at the SPE European Petroleum Conference, London, UK, Oct. 25-27, 1994; Society of Petroleum Engineers, 1994, 16 pages.
Omair et al., "Enhanced Sustained Production from Successful Underbalanced Coiled Tubing Drilling in Saudi Arabian Deep Tight Gas Sandstone and Carbonate Formations," SPE-142363-MS-P, Presented at the SPE Middle East Oil and Gas Show and Conference, Manama, Bahrain, Sep. 25-28, 2011; Society of Petroleum Engineers, 2011, 9 pages.
Pruitt et al., "Underbalanced Coiled Tubing Drilling Update on a Successful Campaign," SPE-92513-MS, Presented at the SPE/IADC Drilling Conference, Amsterdam, The Netherlands, Feb. 23-25, 2005; SPE/IADC Drilling Conference, 2005, 8 pages.
Silva et al., "A Process Delivery Template for an Underbalanced Coiled Tubing Drilling Project from Concept to Execution," SPE-107244-MS, Presented at the SPE/ICoTA Coiled Tubing and Well Intervention Conference and Exhibition, The Woodlands, Texas, Mar. 20-21, 2007, 10 pages.
Pruitt et al., "Underbalanced Coiled Tubing Drilling Update on a Successful Campaign," SPE-92513, Presented at the SPE/IADC Drilling Conference, Amsterdam, The Netherlands, Feb. 23-25, 2005; SPE/IADC Drilling Conference, 2005, 8 pages.
Abaltusov et al., "The use of geosteering to achieve the drilling targets in multilateral fishbone wells in Russkoye Field," Abu Dhabi International Petroleum Exhibition & Conference, Nov. 2019, 14 pages.
Kanfar et al., "Real-time integrated petrophysics: geosteering in challenging geology and fluid systems," SPE Saudi Arabia Section Young Professionals Technical Symposium, Mar. 2012, 10 pages.
PCT International Search Report and Written Opinion in International Appln. No. PCT/US2021/031721, dated Aug. 31, 2021, 16 pages.
PCT International Search Report and Written Opinion in International Appln. No. PCT/US2021/031932, dated Sep. 1, 2021, 15 pages.

* cited by examiner

METHODOLOGY TO MAXIMIZE NET RESERVOIR CONTACT FOR UNDERBALANCED COILED TUBING DRILLING WELLS

TECHNICAL FIELD

This disclosure generally relates to hydrocarbon exploitation involving, for example, heterogeneous reservoirs.

BACKGROUND

In exploiting hydrocarbon in heterogeneous reservoirs, underbalanced coiled tubing drilling (UBCTD) has potential to offer a cost effective solution to increase and sustain production.

SUMMARY

In one aspect, the present disclosure describes a new method for monitoring a well operation, the method including: accessing a plurality of streams of data received from multiple sources during the well operation, wherein: the multiple sources include a well testing process, a biosteering process, a geosteering process, and a drilling process, and the well operation includes sidetracking and drilling one or more laterals from a motherbore; combining the plurality of streams of data on a single montage with a common horizontal axis to track the one or more laterals from the motherbore; and presenting the single montage on a display device to an operator running the well operation.

Implementations may include one or more of the following features.

Implementations may include: identifying an event from two or more streams of data on the single montage with the common horizontal axis; and based on the identified event, correlating the two or more streams of data from the multiple sources. Implementations may further include: calculating a respective parameter from each of the plurality of streams of data; and correlating the respective parameters on the common horizontal axis and during the well operation.

Implementations may further include: based on a correlation of the plurality of streams of data from the multiple sources, adjusting a trajectory of at least one of the one or more laterals from the motherbore. Adjusting a trajectory of the at least one of the one or more laterals may cause an increase of a footage of the trajectory inside a productive zone. Adjusting a trajectory of the at least one of the one or more laterals causes an increase of a productivity index of the well operation.

The stream of data from the well testing process may include data encoding a gas rate at a surface of the well, data encoding pressure measurement, data encoding a status of a choke, and data encoding a status of an artificial gas lift. The stream of data from the biosteering process may include data indicating a porosity of a reservoir layer, and data indicating a lithology of the reservoir layer. The stream of data from the geosteering process may include data indicating formation tops of a reservoir layer, and data indicating offset wells correlation. The stream of data from the drilling process may include data encoding rate of penetration, and data indicating footage drilled.

In another aspect, the present disclosure describes a computer system including a processor and at least one memory, wherein the processor is configured to perform operations of: accessing a plurality of streams of data received from multiple sources during a well operation, wherein: the multiple sources include a well testing process, a biosteering process, a geosteering process, and a drilling process, and the well operation includes sidetracking one or more laterals from a motherbore; combining the plurality of streams of data on a single montage with a common horizontal axis to track the one or more laterals from the motherbore; and presenting the single montage on a display device to an operator running the well operation.

Implementations may include one or more of the following features.

The processor may be further configured to perform the operations of: identifying an event from two or more streams of data on the single montage with the common horizontal axis; and based on the identified event, correlating the two or more streams of data from the multiple sources. The operations may further include: calculating a respective parameter from each of the plurality of streams of data; and correlating the respective parameters on the common horizontal axis and during the well operation.

The processor may be further configured to perform the operations of: based on a correlation of the plurality of streams of data from the multiple sources, adjusting a trajectory of at least one of the one or more laterals from the motherbore. Adjusting a trajectory of the at least one of the one or more laterals may cause an increase of a footage of the trajectory inside a productive zone. Adjusting a trajectory of the at least one of the one or more laterals causes an increase of a productivity index of the well operation.

The stream of data from the well testing process may include data encoding a gas rate at a surface of the well, data encoding pressure measurement, data encoding a status of a choke, and data encoding a status of an artificial gas lift. The stream of data from the biosteering process may include data indicating a porosity of a reservoir layer, and data indicating a lithology of the reservoir layer. The stream of data from the geosteering process may include data indicating formation tops of a reservoir layer, and data indicating offset wells correlation. The stream of data from the drilling process may include data encoding rate of penetration, and data indicating footage drilled.

Implementations according to the present disclosure may be realized in computer implemented methods, hardware computing systems, and tangible computer readable media. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The details of one or more implementations of the subject matter of this specification are set forth in the description, the claims, and the accompanying drawings. Other features, aspects, and advantages of the subject matter will become apparent from the description, the claims, and the accompanying drawings.

DESCRIPTION OF DRAWINGS

Like reference numbers and designations in the various drawings indicate like elements.

DETAILED DESCRIPTION

Since 2008, Underbalanced Coiled Tubing Drilling (UBCTD) has emerged as an effective and economically viable development strategy in exploiting hydrocarbon reservoirs. In some cases, UBCTD has proven to be a suitable approach to exploit more complex reservoir areas, where conventional drilling and stimulation techniques may not always meet well productivity expectations. The UBCTD approach attempts to drill a well with a drilling fluid pressure lower than the reservoir pressure, which tends to minimize the formation damage. Due to the underbalanced condition imposed in the wellbore, the well is allowed to flow naturally during drilling, while its productivity is measured. In some cases, the reservoir engineers employ instantaneous Productivity Index (PI) approach to place the UBCTD laterals effectively in productive zones. This approach relies heavily on time-based gas rates and flowing well pressures are converted into depth-based data and presented in a PI plot to identify potential productive zone during the operations.

Parameters from real-time well testing, geology, and drilling data can be integrated and presented in a series of plots to aid engineers to discern any rate gain or drop by correlating these parameters on a single montage. This holistic view can aid engineers to make informed decision to potentially maximize the effective length during drilling. These advantages have been confirmed by trial experience on a number of wells and from more than 100,000' in of reservoir footage. Indeed, the post drilling along with pressure transient analyses have confirmed the superiority of the integrated methodology over the conventional PI approach in boosting the well productivity with significant economic benefits.

Figure 1:
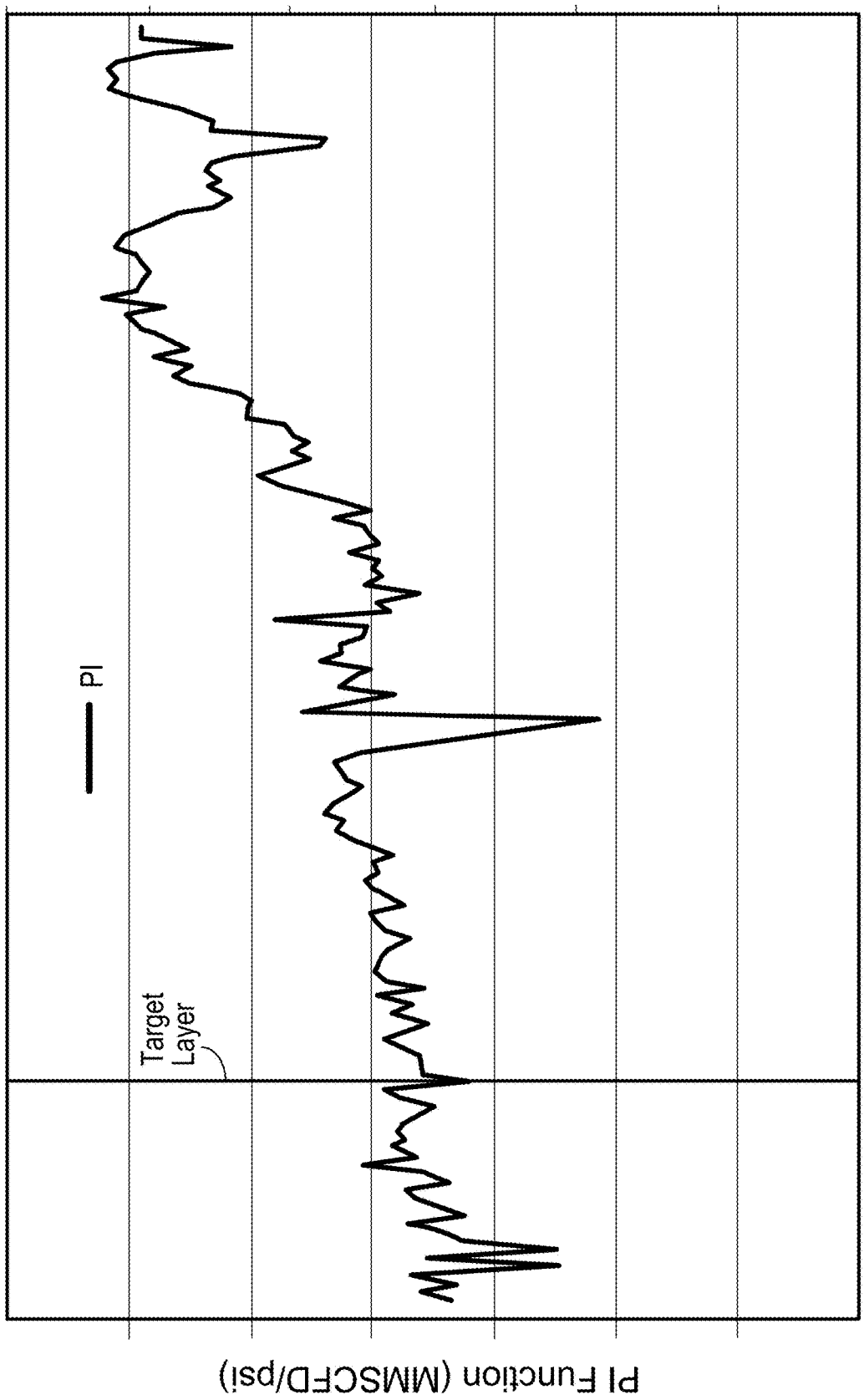
FIG. 1 illustrates an example of a chart showing productivity index as a function of measured depth of a lateral during drilling according to an implementation of the present disclosure.

Referring to FIG. 1, an example of a chart shows a productivity index (PI) as a function of measured depth of a lateral during drilling. At a given time (or depth), the PI is defined as:

$$PI = \frac{Q}{\Delta P}$$

where Q is the gas flowrate (MMSCFD: million standard cubic feet) and delta P (PSI) is the difference of the reservoir pressure and the flowing bottom-hole pressure (FBHP). Here, the PI curve is monitored closely while drilling.

Although the above-described approach can yield good result, the approach has many shortcomings because of other non-reservoir factors (i.e. choke sizes, lift gas, hydrostatics etc.) at play. These non-reservoir factors could affect the PI calculations that engineers tend to overlook. In addition, other available data such measurement while drilling (MWD) data, subsurface geology data and drilling parameters can be helpful. However, such data tended to be overlooked in the traditional PI analysis. Indeed, it had proved difficult to incorporate such data into the PI plot due to lack of coherent and effective integrated workflow. In fact, post UBCTD analyses has confirmed the low productive well length over the gross footage on wells drilled using this approach. Thus, there is a long-felt but unmet need when monitoring a geological drilling site to potentially maximize reservoir contact and ultimately the well productivity.

Figure 3:
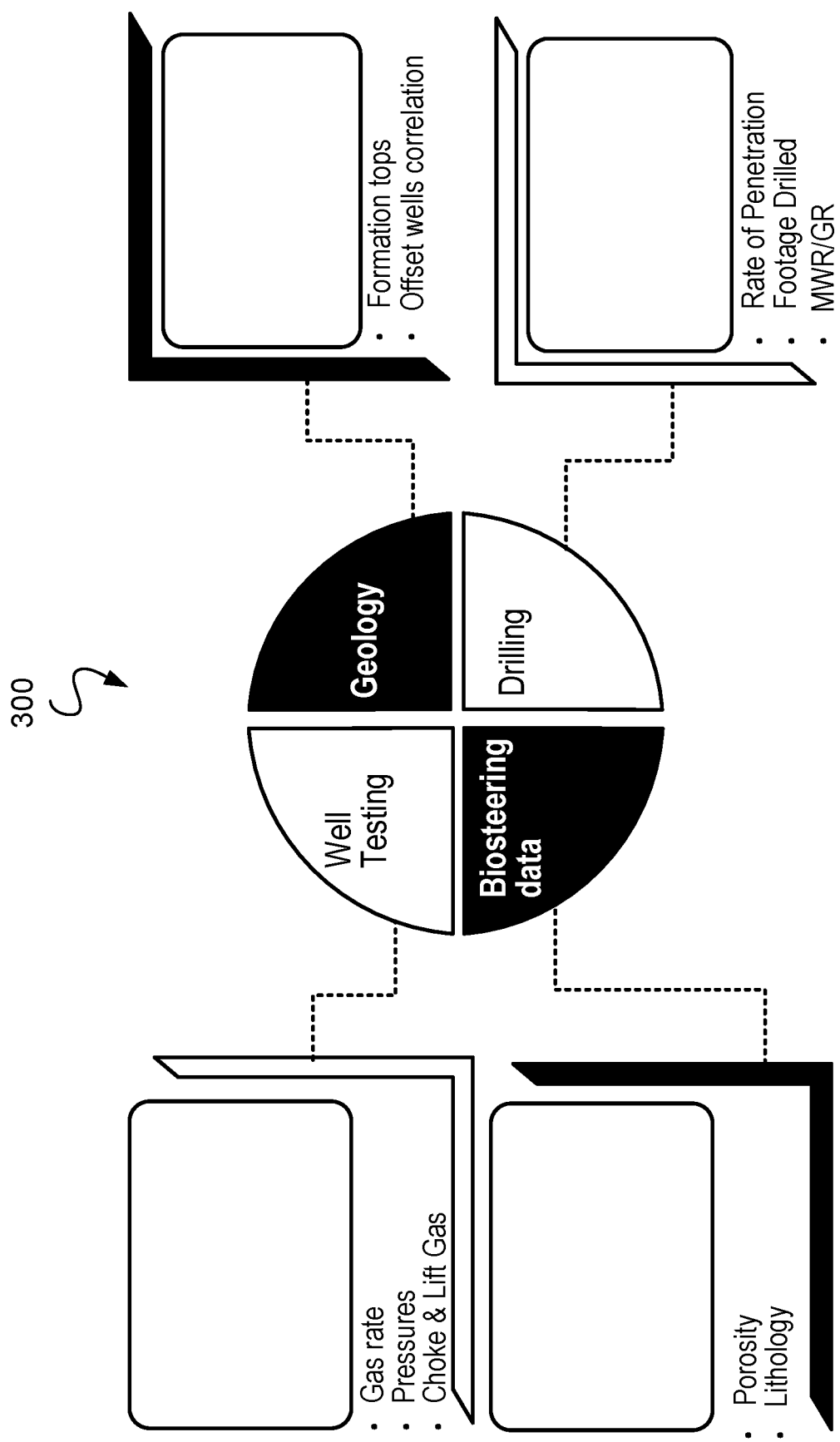
FIG. 3 illustrates an example of integrating data from well testing, biosteering data, geology data, and drilling data according to an implementation of the present disclosure.

FIG. 3 illustrates an example 300 of integrating data from well testing, biosteering data, geology data, and drilling data according to an implementation of the present disclosure.

Here, data from well testing 301 refers to testing data showing, for example, gas rate, pressure inside the bore, choke & artificial lift gas. Gas rate may be measured at the surface when gas exits the well. As an example of gathering data from a well, sensors can be inserted into a well, for example, by means of coiled tubing drilling assembly. The sensors may record, for example, pressure inside the bore. Here, a choke refers to a device incorporating an orifice that is used to control fluid flow rate or downstream system pressure. Chokes are available in several configurations for both fixed and adjustable modes of operation. Adjustable chokes enable the fluid flow and pressure parameters to be changed to suit process or production requirements. Fixed chokes do not provide this flexibility, although they are more resistant to erosion under prolonged operation or production of abrasive fluids. An artificial gas lift may refer to a use of external source of high-pressured gas (typically nitrogen) injected temporarily into the borehole to assist the influx of natural gas into the produced hydrocarbon stream to produce a specific flow rate up the production string associated by lightening the hydrostatic column. This injection can be performed during the initial drilling phase and prior to penetrating the productive interval. The artificial lift is discontinued once the well is able to flow naturally. The artificial gas lift injection can be controlled through pump rate or the volume of the gas pumped as shown in FIG. 4E.

Figure 2:
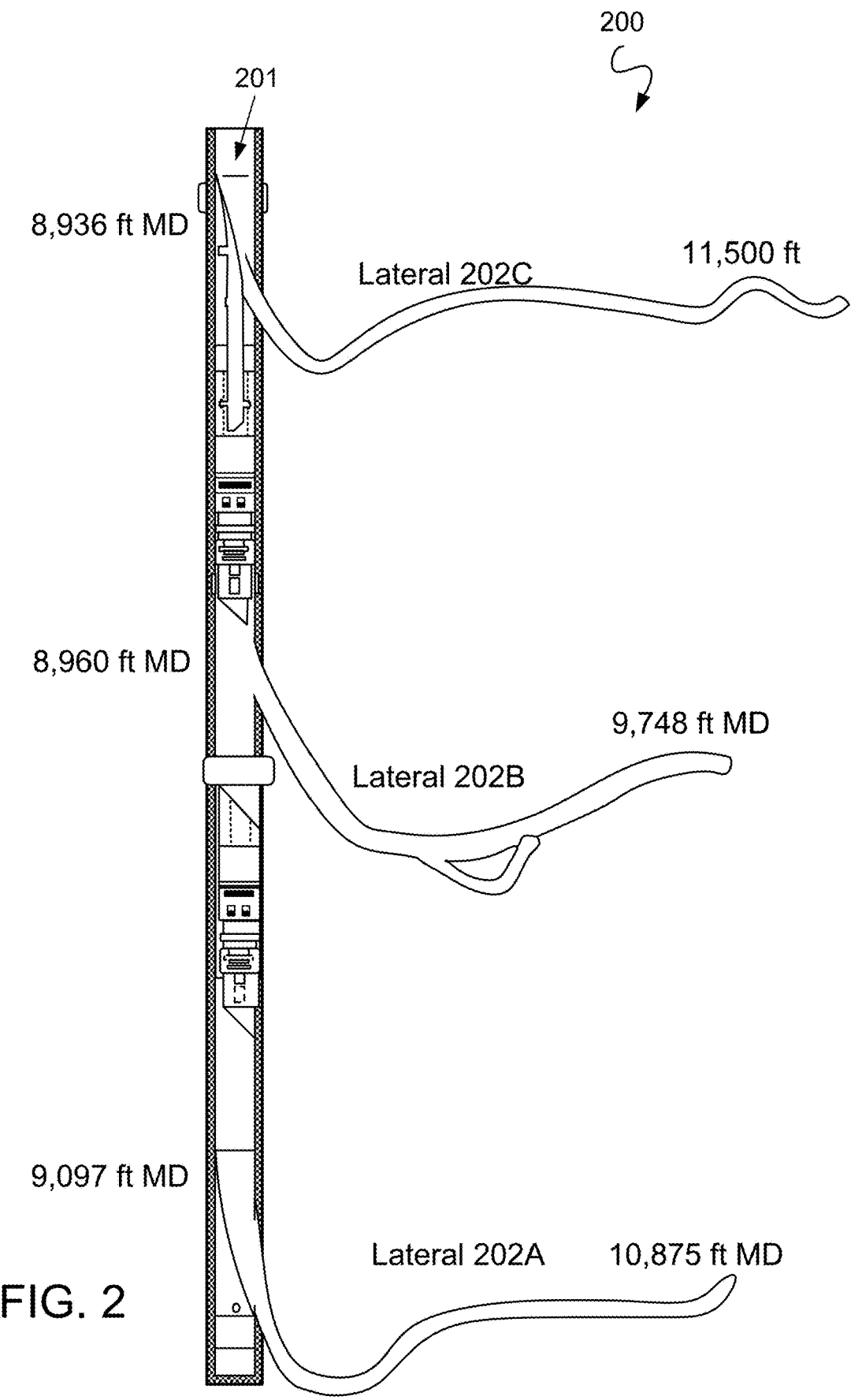
FIG. 2 illustrates an example of a lateral configuration according to an implementation of the present disclosure.

Here, horizontal laterals can be drilled through production tubing during an under balanced coiled tubing drilling process. Referring to FIG. 2, an example 200 is presented to illustrate a lateral configuration for UBCTD according to an implementation of the present disclosure. A well bore 201 refers to a vertical well. Well bore 201 may correspond to a motherbore. Drilling operations can include sidetracking one or more laterals from the motherbore to explore reservoir in the horizontal direction. As illustrated, lateral 202A refers to a first window at 9,097 ft measured depth (MD) as a first side track. The lateral 202A reaches a measured depth (MD) of 10,875 ft. Lateral 202B refers to a second window at 8,960 ft measured depth (MD) as a second side track. The lateral 202B reaches a measured depth (MD) of 9,748 ft. Lateral 202C refers to a third window at 8,936 ft measured depth (MD) as a third side track. The lateral 202C reaches a measured depth (MD) of 11,500 ft. Such configurations can be adaptive in a heterogeneous area with multiple laterals to check on the reservoir.

Returning to FIG. 3, biosteering data 302 refers to wellsite biosteering which can include porosity data and lithology data. A biosteering technique may include taking and analyzing cutting samples during drilling. The biosteering technique may accompany the productivity index (PI) strategy in that cuttings are inspected while drilling to detect, for example, porosity, lithology, and the presence of microfossils. Based on the real-time well productivity, porosity, lithology and the micro-fossils appearance, the well trajectory can be adjusted and corrected during drilling to pursue good wellbore productivity layers.

Geosteering data 303 refers to data encoding, for example, formation tops and offset wells correlation. A geosteering technique may involve the use of gamma ray (GR) data measured during drilling and correlate the measured data with the GR profile from the offset wells. Geosteering data can be used to guide the drilling to land the well on the target layer when the lateral has reached the target entry (TE) point.

Drilling data 304 refers to data encoding rate of penetration (ROP), footage drilled, and MWD (measurement while drilling) parameters. Such data generally refer to dynamic parameters during drilling. These dynamic parameters can characterize the drilling operation.

Figure 4A:
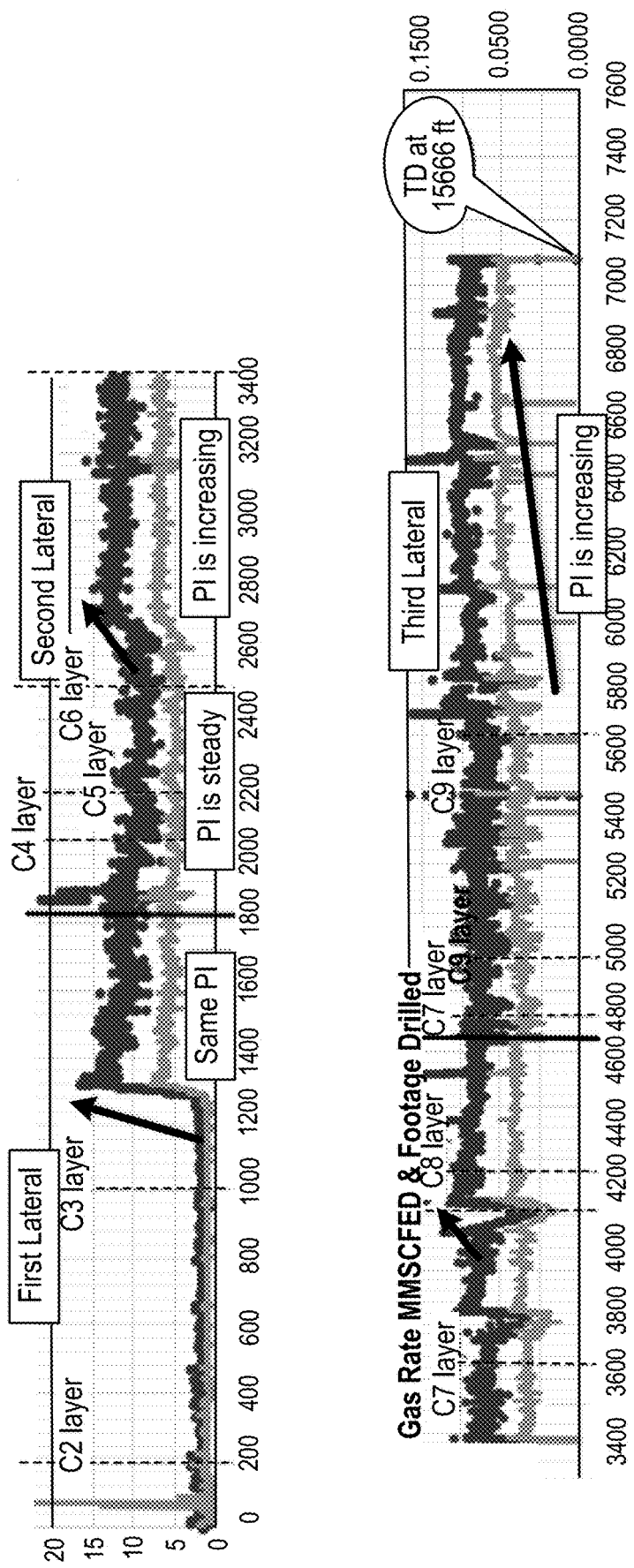
FIGS. 4A-4E illustrate examples of cumulative footage from laterals based on integrating data from multiple channels according to an implementation of the present disclosure.
Figure 4B:
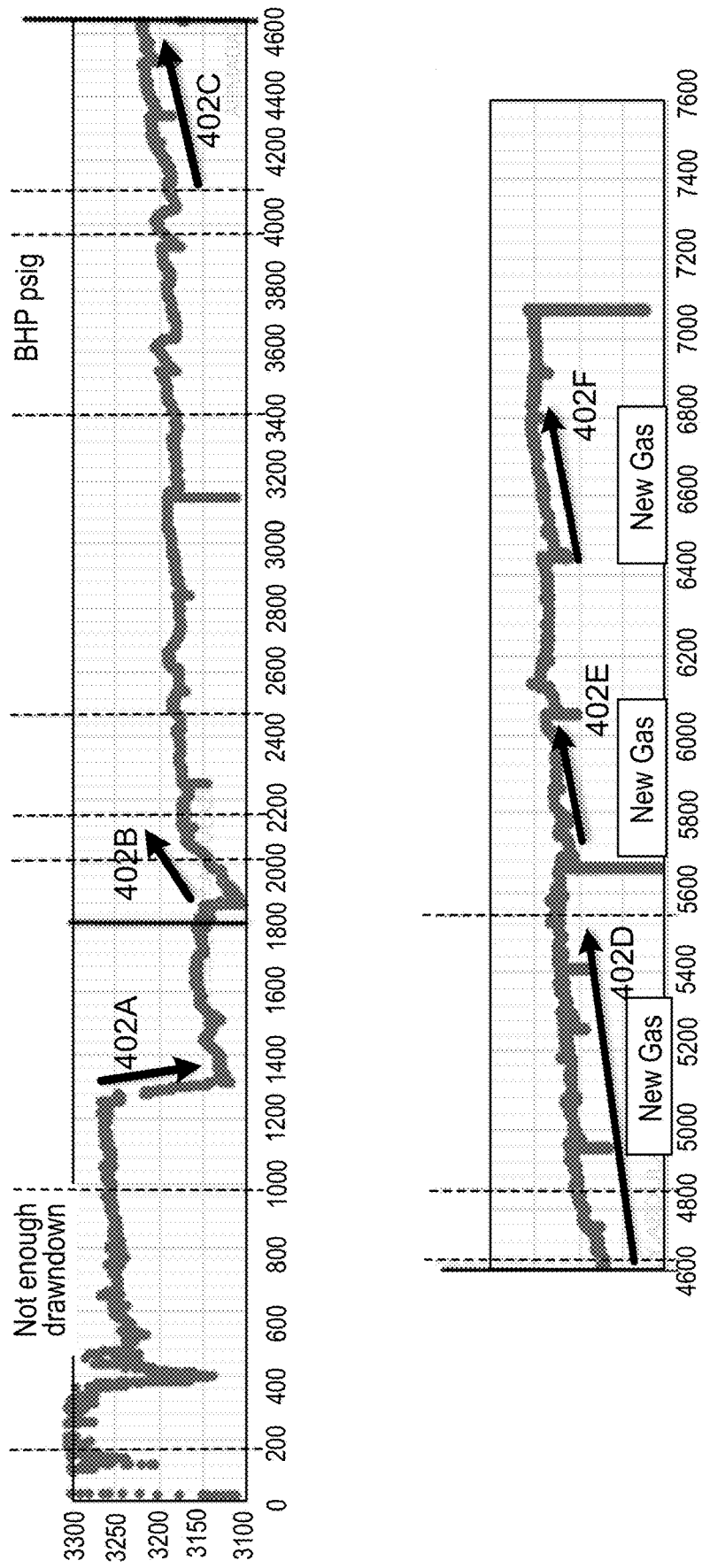
Figure 4C:
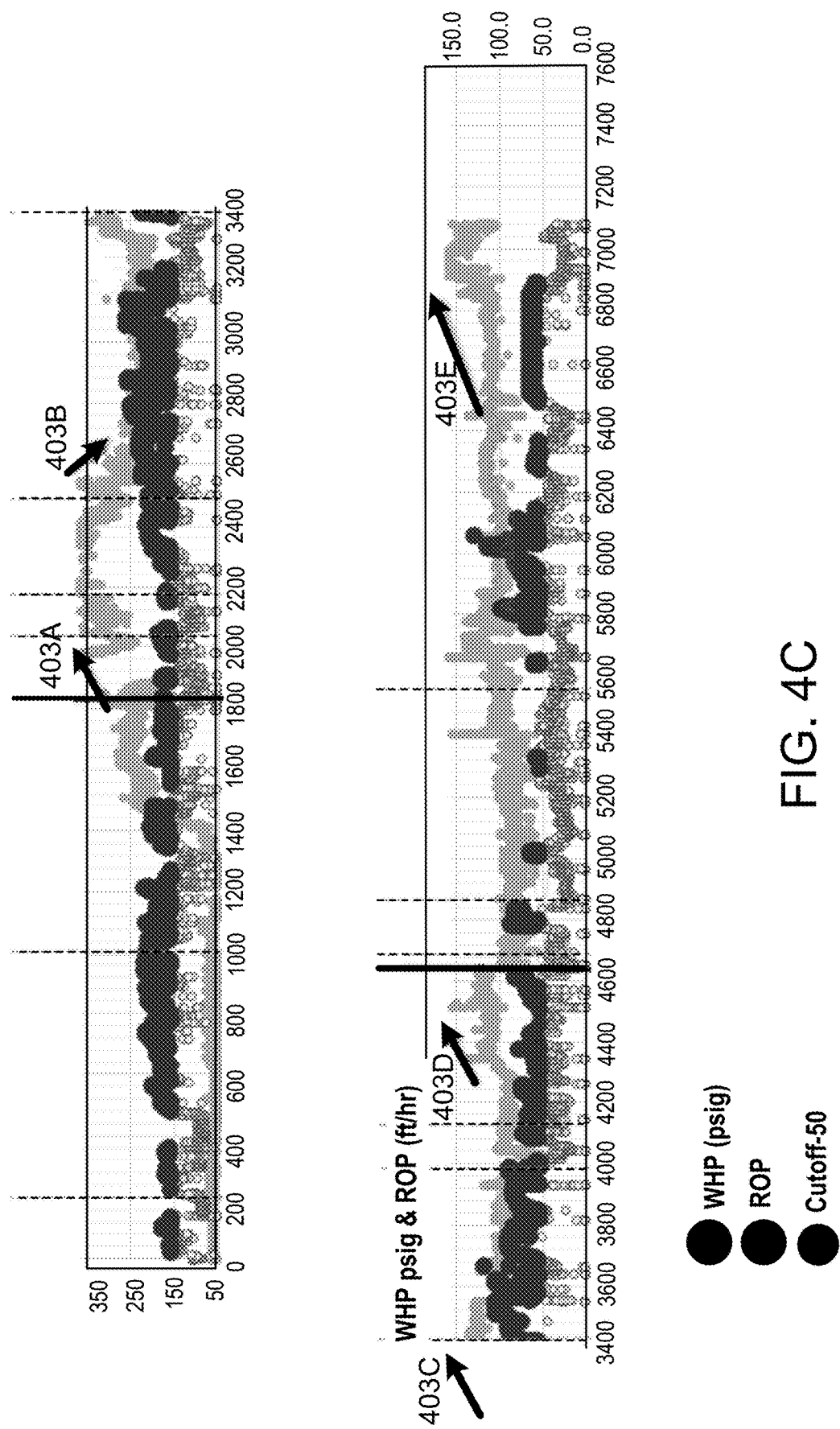
Figure 4D:
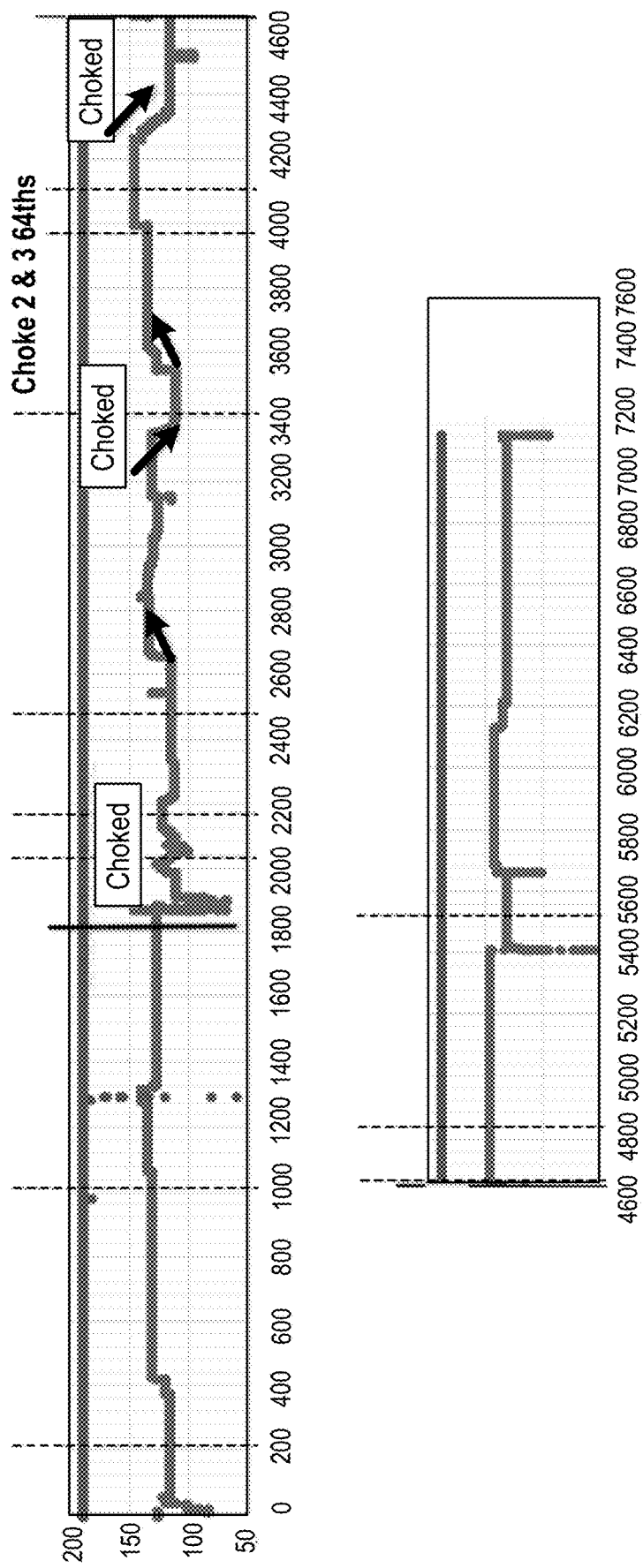
Figure 4E:
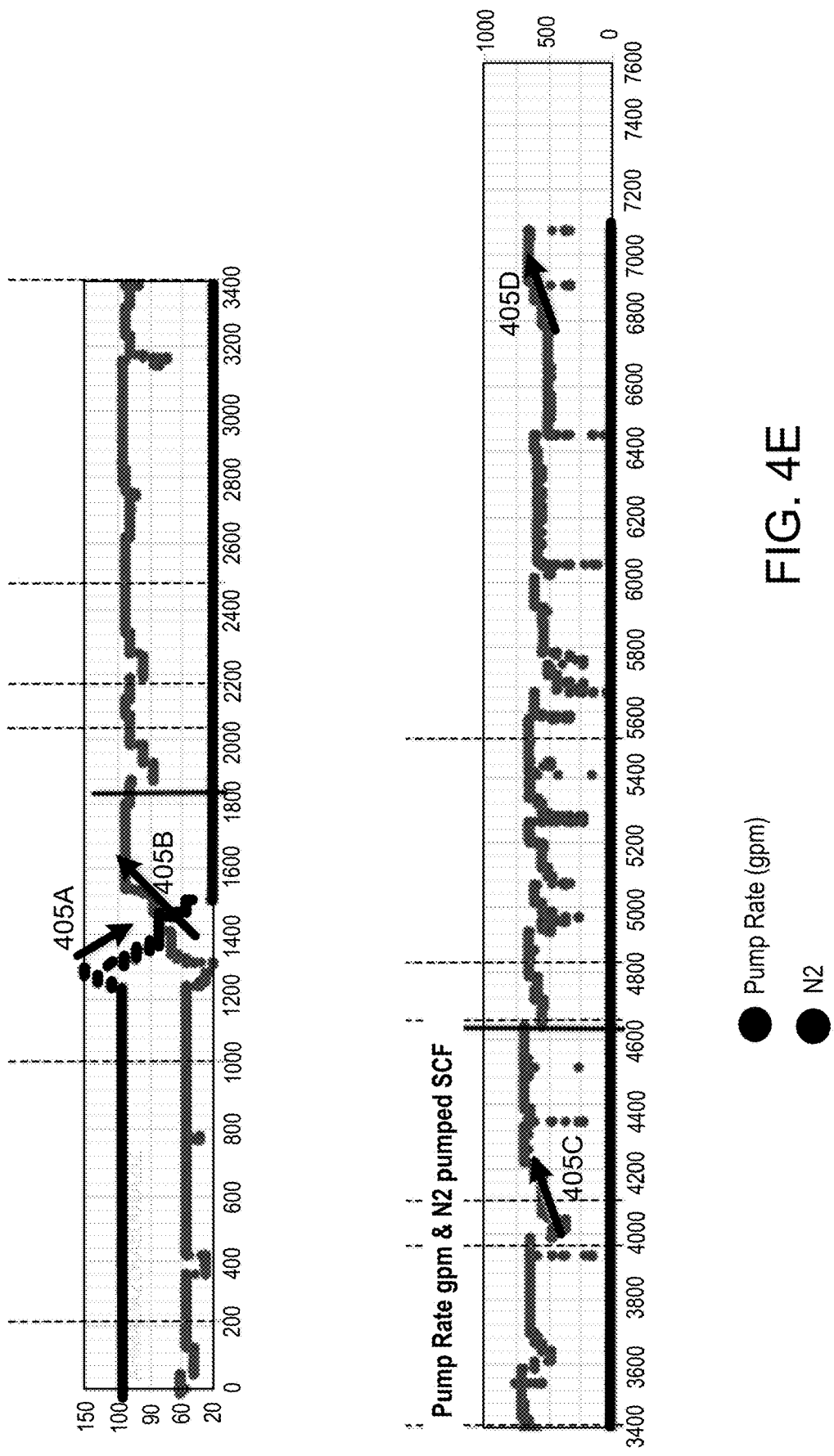

FIGS. 4A-4E illustrate examples of integrating data from multiple channels according to an implementation of the present disclosure. For each figure, the horizontal x-axis corresponds to the cumulative footage drilled from day zero. In FIG. 4A, graph 401 shows the gas rate (darker curve) measured in million standard cubic feet per day (MMSCFD) overlaid with PI (lighter curve) calculated from well testing data. Based on geology and biosteering, the layer tops are remarked and tracked on these two curves to provide feedback to an operator. For example, the layer top interpretation can be based on the gamma ray recordings from the geology. Additionally, based on drilling data, the lateral number (where the side track drilling was conducted) is also tracked and shown. As a result, FIG. 4A shows that during the first lateral, the drilling initially occurs in the C2 layer and then proceeds to the C3 layer when both gas rate and PI experience a simultaneous jump (as indicated by arrow 401A). During the second lateral, the drilling sequentially occurs in the C4 layer, the C5 layer, the C6 layer, the C7 layer, and then the C8 layer. Arrow 401B indicates that PI is increasing when drilling is proceeding in the C6 layer. Arrow 401C indicates V-shape transition in PI when entering the C8 layer from the C7 layer. During the third lateral, the drilling sequentially proceeds from the C7 layer to the C8 layer, and then to the C9 layer. In the C9 layer, drilling leads to a continuous and gradual increase in PI until a total depth of 15,666 ft, as indicated by arrow 401D.

In FIG. 4B, the flowing bottom hole pressure (BHP) performance, as measured while drilling using the bottom-hole pressure sensors inside the drilling assembly, is tracked and analyzed. Here, the BHP is presented on the same horizontal x-axis that corresponds to the cumulative footage drilled from day zero. FIG. 4B shows that during the first lateral and when drilling at the C2 layer, the drawdown is insufficient due to the hydrostatic column and this partly explains the low PI during this lateral. The column was lightened by increasing the nitrogen rate when entering the C3 layer resulting in significant BHP drop as indicated by arrow 402A and therefore allowing the reservoir gas to flow freely. This drop coincides with the concomitant increase in PI in FIG. 4A. As more productive layer is being penetrated, more new gas enters into the lateral and the BHP experiences a slow and steady build-up as indicated by arrows 402B and 402C during the second lateral. The trend of this slow and steady build-up persists into the third lateral. As indicated by arrows 402D, 402E, and 402F, new gas is encountered along the way during the third lateral.

In FIG. 4C, the wellhead pressure (WHP) is tracked (in light curve) from well testing and rate-of-penetration (ROP), measured in ft/hr, is tracked (in dark curve) from drilling. When ROP is greater than 50, the ROP is highlighted in darker curve. Wellhead pressure may also be known as wellhead backpressure. WHP refers to the pressure registered in the wellhead of a producing well. Rate of penetration refers to the speed at which the drill bit can break the rock under it and thus deepen the wellbore. This speed may be reported in units of feet per hour or meters per hour. As shown in FIG. 4C, the WHP and the ROP are generally flat during the first lateral, except when transitioning to the second lateral. As indicated by arrow 403A, the WHP experiences a bump during this transition. Thereafter, the WHP experiences fluctuations indicated by arrows 403B, 403C, and 403D. These fluctuations are generally attributed to the change of choke or BHP. During the third lateral, the WHP was controlled by manipulating the choke in order to control the flaring of new gas at the surface due to safety reasons. Despite this, new gas was being encountered indicated by arrow 403E during the latter half of the third lateral. Notably, however, the portions of ROP greater than 50 ft/hr are much reduced in the third lateral than in the first and second laterals indicating heterogeneity among the layers. Arrows 403A, 403C, and 403E all correspond to an uptick in ROP. Such increase in ROP is another indicator of good reservoir quality during a lateral drill.

FIG. 4D shows choke sizes from well testing that were used during the operations. Choke is a device incorporating an orifice that is used to control fluid flow rate or downstream system pressure. Chokes are available in several configurations for both fixed and adjustable modes of operation. Adjustable chokes enable the fluid flow and pressure parameters to be changed to suit process or production requirements. Fixed chokes may not provide this flexibility, although they are more resistant to erosion under prolonged operation or production of abrasive fluids. Chokes are available in several configurations for both fixed and adjustable modes of operation. Adjustable chokes enable the fluid flow and pressure parameters to be changed to suit process or production requirements. Fixed chokes do not provide this flexibility, although they are more resistant to erosion under prolonged operation or production of abrasive fluids. During UBCTD operations, several chokes are used interchangeably to divert the surface flow as necessary. Each choke is adjustable with various sizes in $64^{th}$ inches. And each choke comes either with 5K or 10K pressure rating. As illustrated, in this case only Choke 2 was used during drilling with sizes adjusted as necessary during the operations as shown with arrows 402B and 402C from FIG. 4B.

FIG. 4E shows the fluid pump rate (light) in gallons per minute and nitrogen injection rate (dark) in scf (standard cubic feet) per minute. As illustrated, the well commenced drilling with 100 scfm nitrified water pumped at 60 gpm to create sufficient underbalance for reservoir gas to flow. However, after drilling about 1,200' without gaining any gas, it was decided that the drawdown was not enough and hence the injected nitrogen was increased to further lighten the hydrostatic column which immediately resulted in increased reservoir gas flowing into the lateral. Once the well was able to sustain the production naturally, the injected nitrogen was gradually dropped to about zero, as indicated by arrow 405A. At the same time, the pump rate was increased, as indicated by arrow 405B, as an additional measure to control the amount of gas produced at the surface as more gas freely flowed signaling more productive layer being drilled. During drilling, the pump rate was kept constant as much as possible to provide substantially constant back pressure to the well (often for well-control purposes). Whenever there were disruptions either at the surface (i.e. change of choke sizes) or downhole (i.e. penetrating new gas), the pump rate was adjusted as indicated by arrow 405C, which corresponds to 401C from FIG. 4A, and arrow 405D that corresponds to 401D from FIG. 4A. Throughout the second and third laterals, the nitrogen injection rate was flat at about zero rate, indicating the artificial lift assistance was no longer needed.

By monitoring a multitude of dynamic parameters from well testing, geosteering, biosteering, and drilling, PI parameters, gas rate, bottom-hole pressure, well-head pressure, ROP, choke size, and N2 injected/pumped can be closely tracked and correlated. The integrated data is then presented in series of plots to aid engineers to discern any rate gain or drop by correlating the characteristic parameters on a single montage (e.g., as a series of plots showing the characteristic parameters). The correlation can be based on using, for example, spreadsheet data. By following up these parameters, the performance of the laterals can be evaluated in terms of gas productivity and reservoir contact. The cumulative footage drilled since the initial lateral can be tracked along with geological data to identify the right productive zones. This would aid the engineers to make informed decision to potentially maximize the effective length during drilling.

For illustration, higher PI could indicate better porosity intervals. Generally, reservoir quality is associated with porosity. Good porosity indicates good reservoir quality that translates to good productivity interval. Such porosity measures can come from biosteering data, which is not available from well testing alone. The objective of drilling is to increase and generally maximize the contact in the good porosity interval. An engineer would normally decide to remain in that good productivity interval.

In some cases, if the PI shows an increasing or steady state trend then the trajectory of the lateral will not be modified. In other words, the trajectory will follow the planned trajectory. If, however, the PI shows a flattening/decreasing trend, then the lateral is likely leaving the productive zone and starting to cut outside the desired layer. In this case, the trajectory needs to be adjusted to return to the good porosity zone or to terminate the current lateral. In other words, decreasing PI could indicate exiting the good interval or showing no new gas to be gained and consequently the engineer would decide to change the trajectory to find higher PI. Other dynamic parameters being monitored can likewise help an engineer predict the evolution of the PI.

Figure 5A:
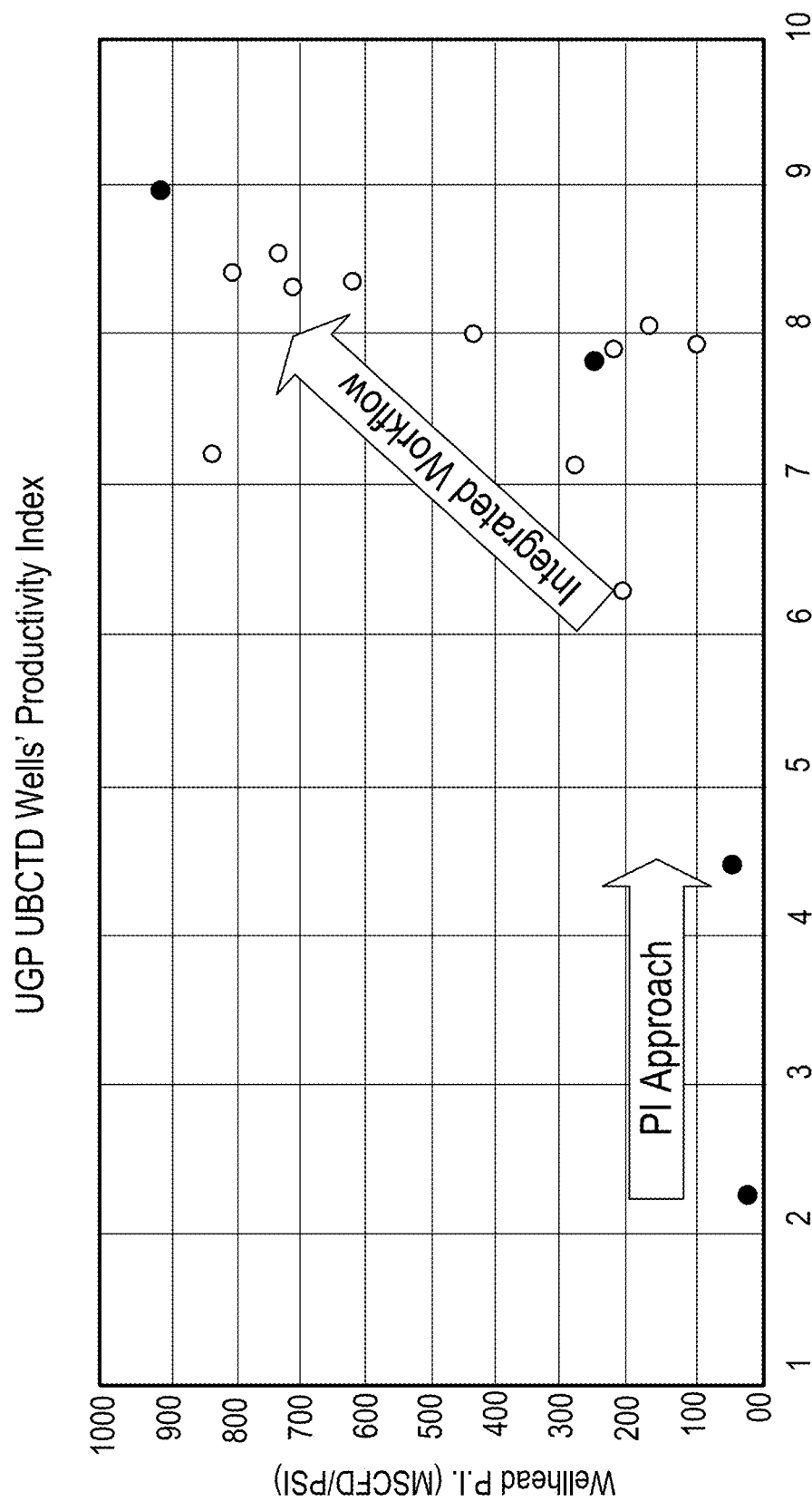
FIG. 5A illustrates an example of improvement to productivity index obtained by data integration according to an implementation of the present disclosure.

This methodology has been proved superior on a number of UBCTD gas wells with more than 100,000 ft drilled in reservoir footage. Specifically, the superiority of the integrated approach over the conventional PI approach in boosting the well productivity is shown in FIG. 5A. Here, examples are illustrated showing improvement to productivity index (measured in unit of thousand cubic feet per day/psi) determined from flowback data after each well was drilled starting from year 1-5 using conventional PI approach and year 5-10 using the implementation of the present disclosure. The first UBCTD well drilled was considered the first year. In particular, the wellhead PIs for wells drilled using conventional PI and the present disclosure methodology were determined over time. This PI is commonly used to gauge the ability of the well to produce. The trend of improvement, demonstrated by a comparison of the data clusters on the right hand side of the graph with the data clusters on the left hand side of the graph, demonstrates the superiority of the integrated approach that takes a holistic view of the multitude of data.

Figure 5B:
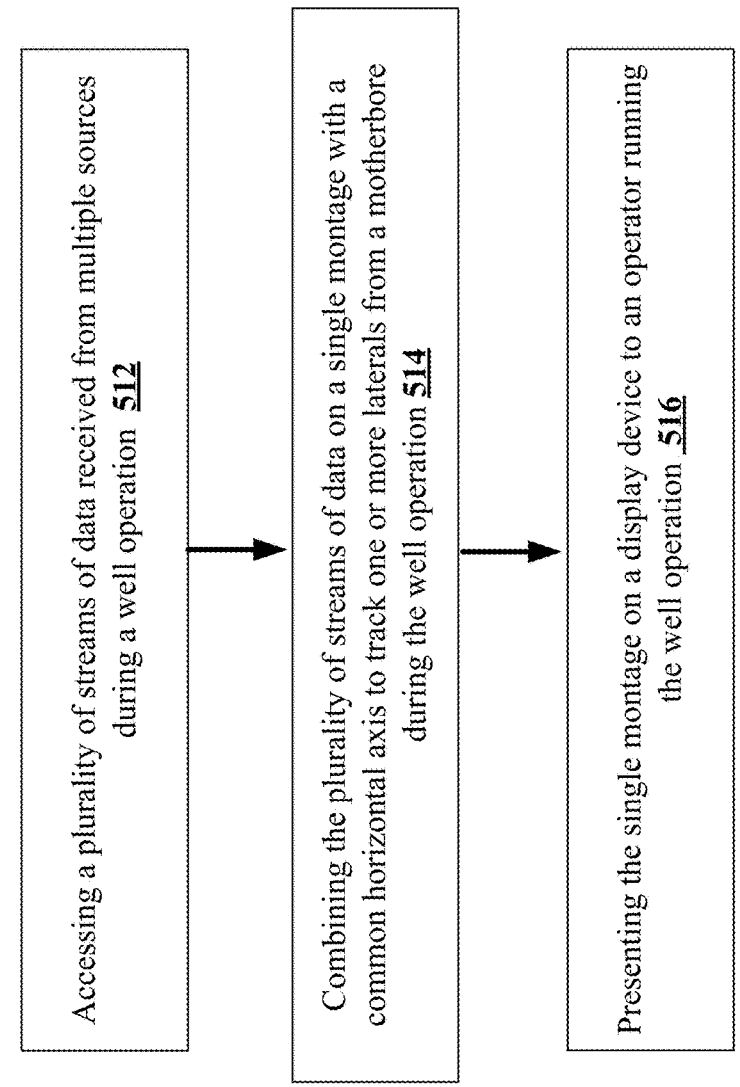
FIG. 5B illustrates an example of a flow chart according to an implementation of the present disclosure.

FIG. 5B is a flow chart 510 showing an example of workflow according to an implementation of the present disclosure. In the context of monitoring a well operation, streams of data are received from multiple sources (512). These sources can include a well testing process, a biosteering process, a geosteering process, and a drilling process. The stream of data from the well testing process can include, for example, data encoding a gas rate at a surface of the well, data encoding pressure measurement, data encoding a status of a choke, and data encoding a status of a gas lift. The stream of data from the biosteering process can include data indicating a porosity of a reservoir layer, and data indicating a lithology of the reservoir layer. The stream of data from the geosteering process can include data indicating formation tops of a reservoir layer, and data indicating offset wells correlation. The stream of data from the drilling process can include data encoding rate of penetration, and data indicating footage drilled. The well operation can include sidetracking one or more laterals from a motherbore. The well operation may particularly incorporate under balanced coiled tubing drilling (UBCTD). To facilitate monitoring, the plurality of data streams can be combined on a single montage with a common horizontal axis to track the one or more laterals from the motherbore (514). For example, implementations can include identifying an event from two or more streams of data on the single montage with the common horizontal axis; and based on the identified event, correlating the two or more streams of data from the multiple sources. Implementations can also include calculating a respective parameter from each of the plurality of streams of data; and correlating the respective parameters on the common horizontal axis and during the well operation. Implementations may also include: based on a correlation of the plurality of streams of data from the multiple sources, adjusting a trajectory of at least one of the one or more laterals from the motherbore. By virtue of the holistic view, more insights from the various sources can be readily combined or confirmed so that a trajectory of the at least one of the one or more laterals can be adjusted in response to this feedback. This adjustment can cause an increase of a footage of the trajectory inside a productive zone, or an increase of a productivity index of the well operation.

Figure 6:
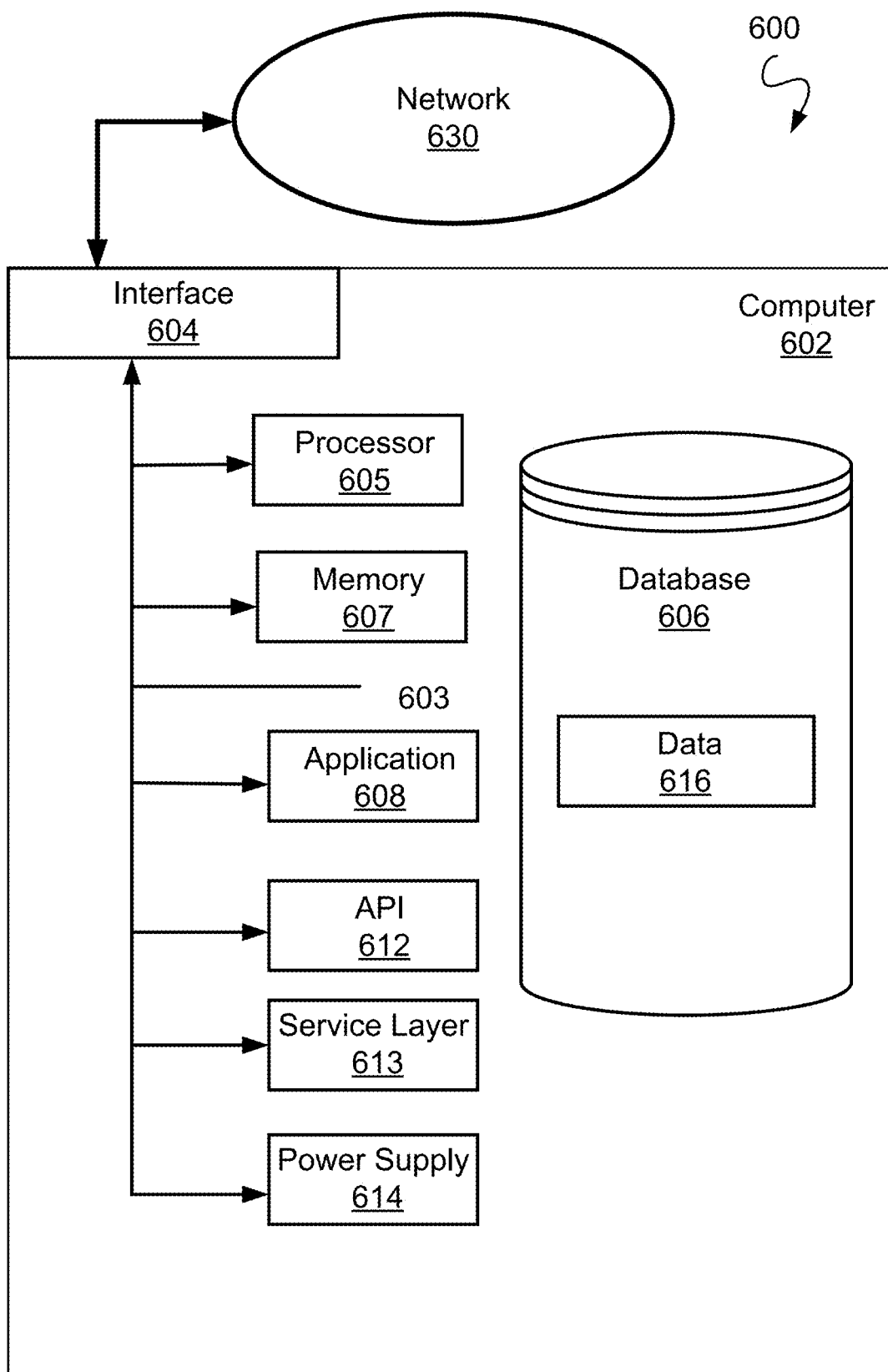
FIG. 6 is a block diagram illustrating an example of a computer system used to provide computational functionalities associated with described algorithms, methods, functions, processes, flows, and procedures, according to an implementation of the present disclosure.

FIG. 6 is a block diagram illustrating an example of a computer system 600 used to provide computational functionalities associated with described algorithms, methods, functions, processes, flows, and procedures, according to an implementation of the present disclosure. The illustrated computer 602 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 602 can comprise a computer that includes an input device, such as a keypad, keyboard, touch screen, another input device, or a combination of input devices that can accept user information, and an output device that conveys information associated with the operation of the computer 602, including digital data, visual, audio, another type of information, or a combination of types of information, on a graphical-type user interface (UI) (or GUI) or other UI.

The computer 602 can serve in a role in a computer system as a client, network component, a server, a database or another persistency, another role, or a combination of roles for performing the subject matter described in the present disclosure. The illustrated computer 602 is communicably coupled with a network 630. In some implementations, one or more components of the computer 602 can be configured to operate within an environment, including cloud-computing-based, local, global, another environment, or a combination of environments.

The computer 602 is an electronic computing device operable to receive, transmit, process, store, or manage data and information associated with the described subject matter. According to some implementations, the computer 602 can also include or be communicably coupled with a server, including an application server, e-mail server, web server, caching server, streaming data server, another server, or a combination of servers.

The computer 602 can receive requests over network 630 (for example, from a client software application executing on another computer 602) and respond to the received requests by processing the received requests using a software application or a combination of software applications. In addition, requests can also be sent to the computer 602 from internal users, external or third-parties, or other entities, individuals, systems, or computers.

Each of the components of the computer 602 can communicate using a system bus 603. In some implementations, any or all of the components of the computer 602, including hardware, software, or a combination of hardware and software, can interface over the system bus 603 using an application programming interface (API) 612, a service layer 613, or a combination of the API 612 and service layer 613. The API 612 can include specifications for routines, data structures, and object classes. The API 612 can be either computer-language independent or dependent and refer to a complete interface, a single function, or even a set of APIs. The service layer 613 provides software services to the computer 602 or other components (whether illustrated or not) that are communicably coupled to the computer 602. The functionality of the computer 602 can be accessible for all service consumers using this service layer. Software services, such as those provided by the service layer 613, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 602, alternative implementations can illustrate the API 612 or the service layer 613 as stand-alone components in relation to other components of the computer 602 or other components (whether illustrated or not) that are communicably coupled to the computer 602. Moreover, any or all parts of the API 612 or the service layer 613 can be implemented as a child or a sub-module of another software module, enterprise application, or hardware module without departing from the scope of the present disclosure.

The computer 602 includes an interface 604. Although illustrated as a single interface 604 in FIG. 6, two or more interfaces 604 can be used according to particular needs, desires, or particular implementations of the computer 602. The interface 604 is used by the computer 602 for communicating with another computing system (whether illustrated or not) that is communicatively linked to the network 630 in a distributed environment. Generally, the interface 604 is operable to communicate with the network 630 and comprises logic encoded in software, hardware, or a combination of software and hardware. More specifically, the interface 604 can comprise software supporting one or more communication protocols associated with communications such that the network 630 or interface's hardware is operable to communicate physical signals within and outside of the illustrated computer 602.

The computer 602 includes a processor 605. Although illustrated as a single processor 605 in FIG. 6, two or more processors can be used according to particular needs, desires, or particular implementations of the computer 602. Generally, the processor 605 executes instructions and manipulates data to perform the operations of the computer 602 and any algorithms, methods, functions, processes, flows, and procedures as described in the present disclosure.

The computer 602 also includes a database 606 that can hold data for the computer 602, another component communicatively linked to the network 630 (whether illustrated or not), or a combination of the computer 602 and another component. For example, database 606 can be an in-memory, conventional, or another type of database storing data consistent with the present disclosure. In some implementations, database 606 can be a combination of two or more different database types (for example, a hybrid in-memory and conventional database) according to particular needs, desires, or particular implementations of the computer 602 and the described functionality. Although illustrated as a single database 606 in FIG. 6, two or more databases of similar or differing types can be used according to particular needs, desires, or particular implementations of the computer 602 and the described functionality. While database 606 is illustrated as an integral component of the computer 602, in alternative implementations, database 606 can be external to the computer 602. As illustrated, the database 606 holds the previously described data 616 including, for example, multiple streams of data from various sources, such as the well testing process, the biosteering process, and geosteering process, and the drilling process.

The computer 602 also includes a memory 607 that can hold data for the computer 602, another component or components communicatively linked to the network 630 (whether illustrated or not), or a combination of the computer 602 and another component. Memory 607 can store any data consistent with the present disclosure. In some implementations, memory 607 can be a combination of two or more different types of memory (for example, a combination of semiconductor and magnetic storage) according to particular needs, desires, or particular implementations of the computer 602 and the described functionality. Although illustrated as a single memory 607 in FIG. 6, two or more memories 607 or similar or differing types can be used according to particular needs, desires, or particular implementations of the computer 602 and the described functionality. While memory 607 is illustrated as an integral component of the computer 602, in alternative implementations, memory 607 can be external to the computer 602.

The application 608 is an algorithmic software engine providing functionality according to particular needs, desires, or particular implementations of the computer 602, particularly with respect to functionality described in the present disclosure. For example, application 608 can serve as one or more components, modules, or applications. Further, although illustrated as a single application 608, the application 608 can be implemented as multiple applications 608 on the computer 602. In addition, although illustrated as integral to the computer 602, in alternative implementations, the application 608 can be external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion or management circuits (including recharging, standby, or another power management functionality). In some implementations, the power-supply 614 can include a power plug to allow the computer 602 to be plugged into a wall socket or another power source to, for example, power the computer 602 or recharge a rechargeable battery.

There can be any number of computers 602 associated with, or external to, a computer system containing computer 602, each computer 602 communicating over network 630. Further, the term "client," "user," or other appropriate terminology can be used interchangeably, as appropriate, without departing from the scope of the present disclosure. Moreover, the present disclosure contemplates that many users can use one computer 602, or that one user can use multiple computers 602.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of media and memory devices, magnetic devices, magneto optical disks, and optical memory device. Memory devices include semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Magnetic devices include, for example, tape, cartridges, cassettes, internal/removable disks. Optical memory devices include, for example, digital video disc (DVD), CD-ROM, DVD+/− R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback. Input from the user can be received in any form, including acoustic, speech, or tactile input. In addition, a computer can interact with the user by sending documents to and receiving documents from a client computing device that is used by the user.

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between networks addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what can be claimed, but rather as descriptions of features that can be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method for monitoring a well operation, the method comprising:
    accessing a plurality of streams of data received from multiple sources during the well operation, wherein:
        the multiple sources include a well testing process, a biosteering process, a geosteering process, and a drilling process, and
        the well operation includes sidetracking and drilling one or more laterals from a motherbore;
    combining the plurality of streams of data on a single montage with a common horizontal axis to track the one or more laterals from the motherbore;
    presenting the single montage on a display device to an operator running the well operation;
    identifying an event from two or more streams of data on the single montage with the common horizontal axis; and
    based on the identified event, correlating the two or more streams of data from the multiple sources.

2. The computer-implemented method of claim 1, further comprising:
    calculating a respective parameter from each of the plurality of streams of data; and
    correlating the respective parameters on the common horizontal axis and during the well operation.

3. The computer-implemented method of claim 1, further comprising:
    based on a correlation of the plurality of streams of data from the multiple sources, adjusting a trajectory of at least one of the one or more laterals from the motherbore.

4. The computer-implemented method of claim 3, wherein adjusting a trajectory of the at least one of the one or more laterals causes an increase of a footage of the trajectory inside a productive zone.

5. The computer-implemented method of claim 3, wherein adjusting a trajectory of the at least one of the one or more laterals causes an increase of a productivity index of the well operation.

6. The computer-implemented method of claim 1, wherein a stream of data from the well testing process comprises data encoding a gas rate at a surface of the well, data encoding pressure measurement, data encoding a status of a choke, and data encoding a status of an artificial gas lift.

7. The computer-implemented method of claim 1, wherein a stream of data from the biosteering process comprises data indicating a porosity of a reservoir layer, and data indicating a lithology of the reservoir layer.

8. The computer-implemented method of claim 1, wherein a stream of data from the geosteering process comprises data indicating formation tops of a reservoir layer, and data indicating offset wells correlation.

9. The computer-implemented method of claim 1, wherein a stream of data from the drilling process comprises data encoding rate of penetration, and data indicating footage drilled.

10. A computer system comprising a processor and at least one memory, wherein the processor is configured to perform operations of:
    accessing a plurality of streams of data received from multiple sources during a well operation, wherein:
        the multiple sources include a well testing process, a biosteering process, a geosteering process, and a drilling process, and
        the well operation includes sidetracking and drilling one or more laterals from a motherbore;
    combining the plurality of streams of data on a single montage with a common horizontal axis to track the one or more laterals from the motherbore;
    presenting the single montage on a display device to an operator running the well operation;
    identifying an event from two or more streams of data on the single montage with the common horizontal axis; and
    based on the identified event, correlating the two or more streams of data from the multiple sources.

11. The computer system of claim 10, wherein the operations further comprise:
    calculating a respective parameter from each of the plurality of streams of data; and
    correlating the respective parameters on the common horizontal axis and during the well operation.

12. The computer system of claim 10, wherein the operations further comprise:
    based on a correlation of the plurality of streams of data from the multiple sources, adjusting a trajectory of at least one of the one or more laterals from the motherbore.

13. The computer system of claim 12, wherein adjusting a trajectory of the at least one of the one or more laterals causes an increase of the trajectory inside a productive zone.

14. The computer system of claim 12, wherein adjusting a trajectory of the at least one of the one or more laterals causes an increase of a productivity index of the well operation.

15. The computer system of claim 10, wherein a stream of data from the well testing process comprises data encoding a gas rate at a surface of the well, data encoding pressure measurement, data encoding a status of a choke, and data encoding a status of an artificial gas lift.

16. The computer system of claim 10, wherein a stream of data from the biosteering process comprises data indicating a porosity of a reservoir layer, and data indicating a lithology of the reservoir layer.

17. The computer system of claim 10, wherein a stream of data from the geosteering process comprises data indicating formation tops of a reservoir layer, and data indicating offset wells correlation.

18. The computer system of claim 10, wherein a stream of data from the drilling process comprises data encoding rate of penetration, and data indicating footage drilled.

* * * * *